(12) United States Patent
Johnson et al.

(10) Patent No.: US 10,047,493 B2
(45) Date of Patent: Aug. 14, 2018

(54) HYBRID UTILITY COVER

(71) Applicant: Hubbell Incorporated, Shelton, CT (US)

(72) Inventors: Samuel Theophilis Johnson, Orangeville, CA (US); Michael Edward Fisher, Knoxville, TN (US); John Thomas Polk, III, Townsend, TN (US)

(73) Assignee: Hubbell Incorporated, Shelton, CT (US)

( * ) Notice: Subject to any disclaimer, the term of this patent is extended or adjusted under 35 U.S.C. 154(b) by 71 days.

(21) Appl. No.: 14/844,372

(22) Filed: Sep. 3, 2015

(65) Prior Publication Data
US 2016/0069039 A1    Mar. 10, 2016

Related U.S. Application Data

(60) Provisional application No. 62/046,688, filed on Sep. 5, 2014.

(51) Int. Cl.
*E02D 29/14* (2006.01)
*G01D 4/00* (2006.01)
*H04Q 9/00* (2006.01)

(52) U.S. Cl.
CPC ......... *E02D 29/1481* (2013.01); *G01D 4/008* (2013.01); *H04Q 9/00* (2013.01); *H04Q 2209/30* (2013.01); *H04Q 2209/60* (2013.01); *Y02B 90/247* (2013.01); *Y04S 20/50* (2013.01)

(58) Field of Classification Search
CPC . E02D 29/14; E02D 29/1454; E02D 29/1481; H04Q 2209/30; H04Q 2209/60; Y02B 90/247; Y04S 20/50
See application file for complete search history.

(56) References Cited

U.S. PATENT DOCUMENTS

| 317,153 | A | 5/1885 | Lowrie |
| 2,608,085 | A | 8/1952 | Castle |
| 2,697,389 | A | 12/1954 | Heckman |
| 3,530,696 | A | 9/1970 | Dunmire |
| 5,123,776 | A | 6/1992 | Lang et al. |
| 6,414,605 | B1 * | 7/2002 | Walden ................ G01D 4/008 340/870.02 |
| 7,619,878 | B1 | 11/2009 | Cook |
| 8,258,977 | B1 | 9/2012 | Montestruque |
| 9,258,992 | B2 * | 2/2016 | Shefer .................... E02D 29/14 |
| 2001/0011009 | A1 * | 8/2001 | Harada ................. G02B 6/4451 455/40 |
| 2004/0042849 | A1 * | 3/2004 | Jurich .................... E02D 29/14 404/25 |

(Continued)

FOREIGN PATENT DOCUMENTS

CN    2764821 Y    3/2006

OTHER PUBLICATIONS

PCT International Search Report and Written Opinion dated Nov. 27, 2015 from corresponding Application No. PCT/US2015/048329, 10 pages.

*Primary Examiner* — Abigail A Risic
(74) *Attorney, Agent, or Firm* — Dilworth IP, LLC

(57) ABSTRACT

A utility cover for covering an opening includes an outer frame formed of a first material and an insert within the outer frame formed of a second material, wherein at least a portion of the insert is substantially transparent to wireless communications.

12 Claims, 9 Drawing Sheets

(56) References Cited

U.S. PATENT DOCUMENTS

| | | | |
|---|---|---|---|
| 2007/0194493 A1 | 8/2007 | Jurich et al. | |
| 2008/0050175 A1* | 2/2008 | Brady | E02D 29/124 404/25 |
| 2008/0074283 A1 | 3/2008 | Verkleeren | |
| 2010/0019912 A1* | 1/2010 | Wander | E02D 29/1427 340/632 |
| 2012/0098710 A1* | 4/2012 | Seal | H01Q 9/16 343/702 |
| 2012/0114414 A1* | 5/2012 | Jang | E02D 29/14 404/25 |
| 2013/0011194 A1 | 1/2013 | Lorenz | |
| 2013/0212945 A1 | 8/2013 | Lanham et al. | |
| 2013/0301190 A1* | 11/2013 | Metzger | G01D 4/002 361/679.01 |
| 2014/0144067 A1* | 5/2014 | Shefer | E02D 29/14 43/132.1 |
| 2015/0122959 A1* | 5/2015 | Cook | G01F 15/18 248/205.1 |
| 2016/0094897 A1* | 3/2016 | Kenig | H04Q 9/00 340/870.02 |
| 2017/0023612 A1* | 1/2017 | Brown | G01R 1/04 |

\* cited by examiner

HYBRID UTILITY COVER

REFERENCE TO RELATED APPLICATION

The present disclosure is based on and claims benefit from U.S. Provisional Application Ser. No. 62/046,688 filed Sep. 5, 2014 and entitled "Hybrid Utility Cover" the entire contents of which are herein incorporated by reference.

BACKGROUND

Field

The present disclosure relates generally to utility covers, and more particularly to hybrid utility covers.

Description of the Related Art

Water, electric and gas utilities often use subterranean passages or tunnels as conduits, with surface access openings. Such surface access openings, sometimes referred to as manholes, are ordinarily covered by utility covers, sometimes referred to as manhole covers. To access the manhole, workers would remove the utility cover from an access opening, and subsequently replace the utility cover over the access opening.

Traditional utility covers are constructed from cast-iron or steel and fit into a mating surface of a manhole ring or frame made from similar metal or concrete. The utility cover installed onto such a frame can typically endure vehicle and pedestrian traffic.

Smaller covers are used to cover smaller openings used in other applications. Smaller openings may provide access to subterranean utility meters or service valves at a street or sidewalk location. When installed, such smaller covers are typically subjected to pedestrian and/or vehicle traffic. The smaller covers are removed temporarily when workmen want access to the underlying utility meters or service valves and restored when the workmen are done.

Traditional utility covers cover ground openings and provide a surface to support pedestrian and vehicular traffic. In some cases, utility covers also provide access to subterranean electronic modules, such as automatic meter reading equipment and associated radio and antenna systems. However, traditional utility covers are made of metal and therefore interfere with the transmission of electromagnetic signals. Accordingly, such traditional utility covers are not suitable in applications where electromagnetic signals are being emitted by an electronic module provided below the utility cover and which signals are intended to be received by devices above ground.

SUMMARY OF THE PRESENT DISCLOSURE

A utility cover for covering an opening includes an outer frame formed of a first material and an insert within the outer frame formed of a second material, wherein at least a portion of the insert is substantially transparent to wireless communications.

A hybrid utility cover includes a first material forming an outer frame and a second material formed within the outer frame. The second material is substantially more permeable to electromagnetic waves than the first material.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein.

DETAILED DESCRIPTION

The illustrative embodiments of the present disclosure describe systems including those for providing electronic module capabilities to utility enclosure covers while also providing traditional utility cover functionality.

In certain embodiments, the hybrid utility cover includes a ring or frame which may be metallic (e.g., steel, iron, cast iron, etc.), an insert (e.g., a polymer concrete insert) and an electronic module mount coupled to the insert within a cavity. In some embodiments, an electronic module is coupled to the hybrid utility cover by mating with a threaded portion of the electronic module mount. Other methods of attaching the electronic module to the hybrid utility cover may be used.

The electronic module may include a radio transceiver, a power source such as a battery and an associated antenna for transmitting and receiving radio signals through the insert. For example, the electronic module may be an ITRON AMR automated meter reading solution available from Itron of Liberty Lake, Wash., USA. Alternatively, other types of electronic modules may be used for other applications that wirelessly transmit and/or receive In certain embodiments, the hybrid utility cover includes a retractable locking mechanism lockable and unlockable using a key.

In certain embodiments, a hybrid utility cover is formed from cast iron and polymer concrete and is intended for use with water utility enclosures.

The hybrid utility cover may include a module mount that is preferably threaded for securing an electronic module. In certain illustrative embodiments, the threaded mount has a top portion that is flush with or just below a top surface of the hybrid utility cover such that it may be subject to surface traffic. In an embodiment, the threaded mount has a threaded opening at a bottom portion that is open to a cavity below the hybrid utility cover. The electronic module may be secured to the mount such as by engaging threads and preferably includes an antenna.

In certain illustrative embodiments, the polymer concrete cover also includes one or more cavities for providing a locking mechanism including a keyway accessible from the top surface of the hybrid utility cover.

In certain illustrative embodiments, the top surface of the insert is covered by a skid resistant surface that is fiberglass reinforced and that is applied to the top surface of the polymer concrete insert of the hybrid utility cover excluding the keyhole. Additionally, in certain illustrative embodiments, the bottom cavities for the insert and lock mechanism are covered by a fiberglass reinforced coating. In an alternative applicable to any of the embodiments and alternatives described herein, the bottom fiberglass reinforced layer may be omitted.

Figure 1:
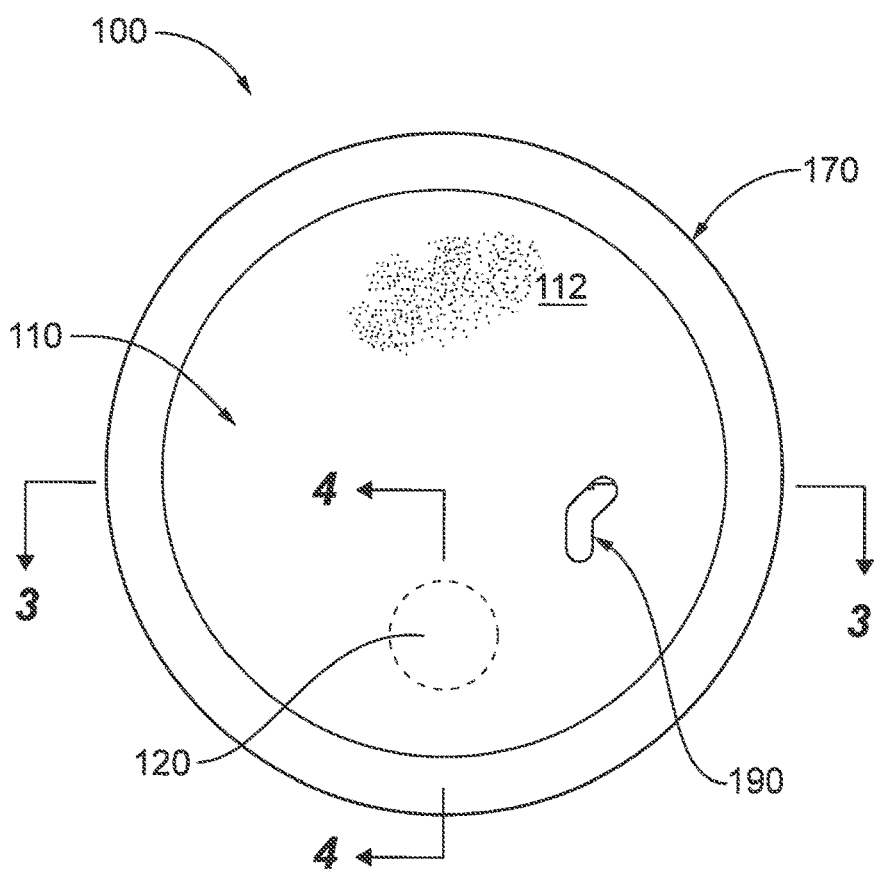
FIG. 1 is a top view of a utility cover according to an embodiment of the present disclosure.

Referring to FIG. 1, a utility cover 100 according to an exemplary embodiment of the present disclosure is shown. In this embodiment, the utility cover 100 includes an insert 110 within an outer ring 170. According to an embodiment of the present disclosure, the outer ring 170 is made of a metal such as cast iron. The outer ring 170 may have rough finishing and/or interior protrusions to mate with corresponding features of the insert 110 that hold the insert 110 in position within the outer ring 170. Insert 110 may be formed from a suitable material or combination of materials that provide sufficient strength as well as the capability of allowing radio waves to propagate through the material without substantial loss of signal power. A non-limiting example of a suitable material for forming insert 110 is a polymer containing material such as polymer concrete.

The insert 110 is preferably substantially transparent to portions of the electromagnetic spectrum that are used for wireless communications. According to an embodiment of the present disclosure, the material forming insert 110 allows at least 50% of incident radio frequency energy in the 2.4 megahertz band to pass there through.

According to an embodiment of the present disclosure, insert 110 is formed of polymer concrete and may include a structural-reinforcement such as, for example, one or more fiberglass-reinforced surface layers 112. According to an embodiment of the present disclosure, the fiberglass-reinforced surface layer 112 may provide a skid-resistant surface.

Figure 2:
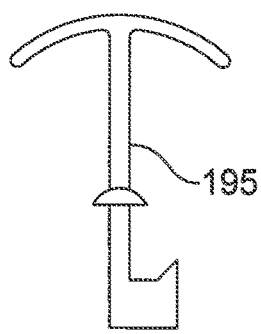
FIG. 2 is a side view of a key used to unlock the utility cover of FIG. 1.

Insert 110 may include one or more orifices as required. For example, insert 110 may include a keyway 190 for permitting key access to a locking mechanism (shown in FIGS. 3 and 5) provided on an opposite side of the keyway 190. The keyway 190 is suitably dimensioned to receive a key and may be about 15/16 of an inch by 19/16 inches across the extreme ends of the opening of the keyway 190. An example of a key 195 utilized for locking and unlocking is shown in FIG. 2. Key 195 is dimensioned to fit through the keyway 190 and engage a locking mechanism provided on the other side of the keyway 190.

According to an embodiment, key 195 unlocks the locking mechanism to allow the utility cover 100 to be removed from a mounted position as will be described later below.

According to an embodiment of the present disclosure, insert 110 spans the interior of the outer ring 170 and provides a load carrying capacity suitable for pedestrian and/or vehicular traffic. The one or more fiberglass-reinforced surface layers 112 provide additional load handling capacity and shear resistance even when there are cavities or openings formed within the cover 110.

According to an embodiment of the present disclosure, an electronic module mount 120 may be mounted on the bottom side of the insert 110. An electronic module may be affixed to the electronic module mount 120 such that the electronic module is within a cavity when the hybrid utility cover 100 is used to cover an opening of a cavity. For example, the cavity may contain a meter such as, for example, a water meter and the electronic module may include a radio frequency (RF) antenna for transmitting and receiving electronic wireless communications so that the meter can be electronically read through the insert 110.

Figure 3:
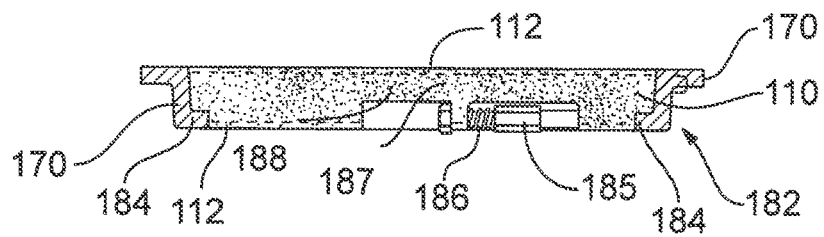
FIG. 3 is a cross sectional view of the utility cover of FIG. 1 taken along line 3-3.
Figure 4:
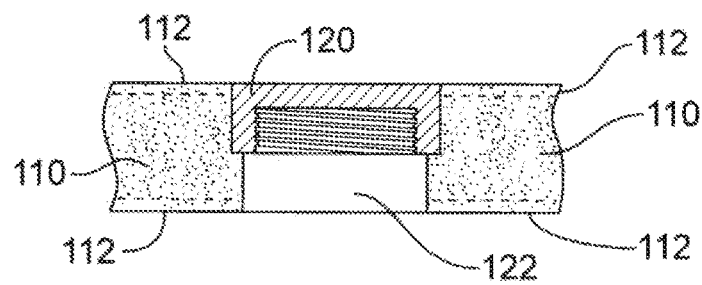
FIG. 4 is a cross section view of a portion of the utility cover of FIG. 1, taken along line 4-4.

As shown in FIG. 3, insert 110 has an outer diameter similar to an inner diameter of outer ring 170 such that insert 110 fits snugly within the outer ring 170 and rests on the lower ledge 184 of outer ring 170. According to this embodiment, insert 110 includes an upper fiberglass-reinforced surface layer 112 and a lower fiberglass-reinforced surface layer 112. According to an embodiment of the present disclosure, insert 110 is a polymer concrete which, during manufacture of the utility cover 100, is poured into the outer ring 170 and conforms to the shape thereof.

Figure 5:
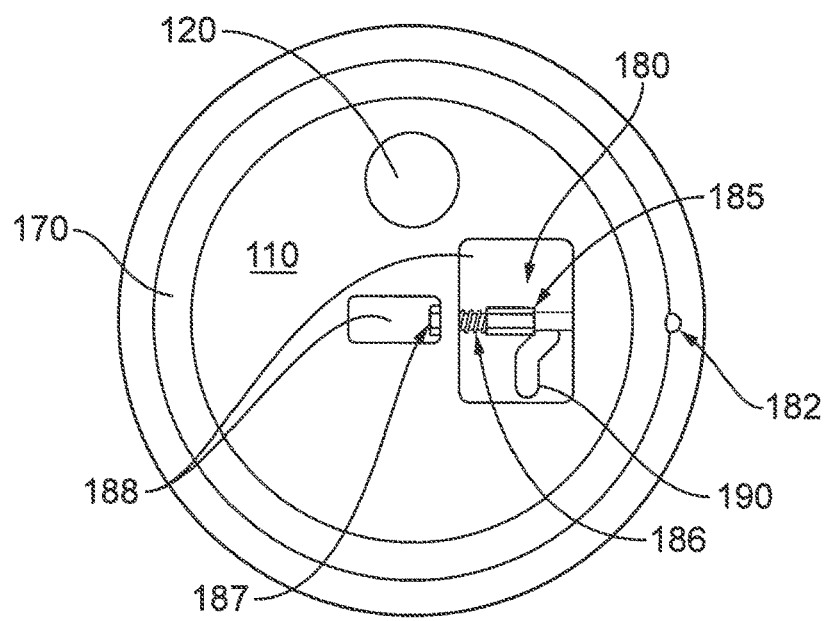
FIG. 5 is a bottom view of the utility cover of FIG. 1.

As shown in FIGS. 3 and 5, a locking mechanism is contained within a locking-mechanism cavity 188 formed in insert 110. The locking mechanism includes a retractable pin 182 which is threaded at one end for receiving coupling nut 185. A distal end of retractable pin 182 extends though orifices provided in insert 110 and the lower edge of outer ring 170. This is the locked position. In the locked position, the distal end of retractable pin 182 engages a locking member formed in a wall of a member in which utility cover 100 is mounted. The threaded end of retractable pin 182 extends through another opening in insert 110. The threaded end of retractable pin 182 has a threaded fastener 187 attached thereto for maintaining the retractable pin 182 in position. A compression spring 186 is provided on the threaded end of retractable pin 182 between insert 110 and coupling nut 185 and biases retractable pin 182 in the locked position.

Referring to FIG. 5, when key 195 is inserted in keyway 190 it engages coupling nut 185. When key 195 is turned, key 195 urges coupling nut 185 in a leftward direction as depicted in FIG. 5 compressing compression spring 186 and retracts retractable pin into the orifice provided in the lower edge of outer ring 170. This is the unlocked position. In this unlocked position, utility cover 100 can be readily lifted from its mounted position thereby exposing the cavity being covered.

An electronic module mount 120 is embedded in the insert 110. According to this embodiment of the present disclosure, the mount 120 has threads for receiving and securing an electronic module through a cavity 122 exposed at the bottom of the insert 110. According to other embodiments, an adapter (not shown) may be threaded into mount 120 and an electronic module may be attached to an end of the adapter extending from the cavity 122.

According to an embodiment of the present disclosure, electronic module mount 120 may he provided in-situ when insert 110 is formed. According to this embodiment, mount 120 may include external surface irregularities or protrusions to fix its location in the insert 110 when formed. For example, one or more quarter-inch radius semicircular channels may be molded or formed in the exterior surface of the electronic module mount 120 in order to fix the electronic module mount 120 in place.

According to an embodiment of the present disclosure, the cavity 122 may be formed by a mold used to form the insert 110. Alternatively, cavity 122 may be formed in insert 110 after partial or full curing of the material forming insert 110 by, for example, drilling appropriate sized openings in insert 110. The electronic module itself may be permanently attached to the underside of utility cover 100 by, for example, gluing the module into cavity 122. In the alternative, the electronic module mount 120 may be glued into the cavity 122 using an appropriate adhesive. For example, if the electronic module mount 120 is plastic, then appropriate glue for adhering such plastic to the insert 110 may be utilized. Electronic module mount 120 may be formed from any suitable type of material including plastics such as HDPE or polystyrene. Of course, other methods may be used to maintain the electronic module mount 120 in position. Utilizing the electronic module mount 120, the electronic module which is removably affixed in the mount can be readily replaced as required.

Figure 11:
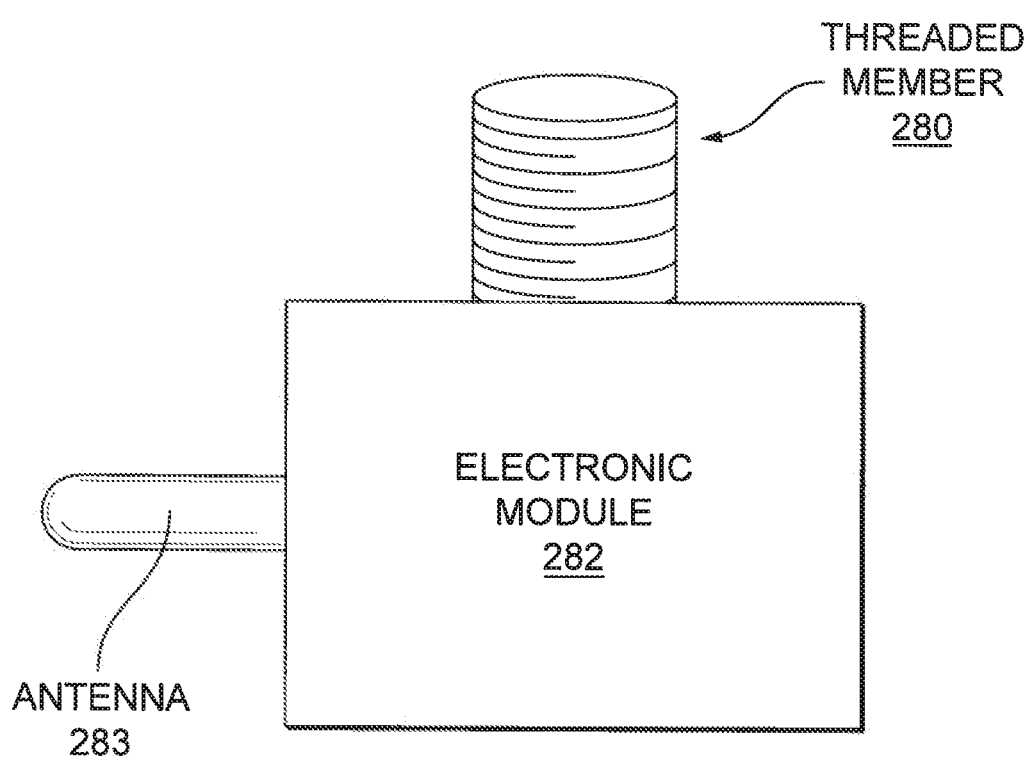
FIG. 11 is a side view of an electronic module according to an embodiment of the present disclosure.

An example of a suitable electronic module that may be mounted to electronic module mount 120 is shown in FIG. 11 and includes electronic module 282 having electronic circuitry for reading a meter, a power source such as a battery and RF circuitry for generating signals what may be transmitted utilizing antenna 283 and/or a receiver for receiving and processing signals received by antenna 283. The module also includes a threaded mount 280 dimensioned to he screwed into mount 120 in insert 110. The electronic module may be, for example, an ITRON AMR automated meter reading solution available from Itron of Liberty Lake, Wash., USA. According to an embodiment of the present disclosure, the electronic module is an automatic meter reading module with radio transceiver and associated antenna.

Figure 6:
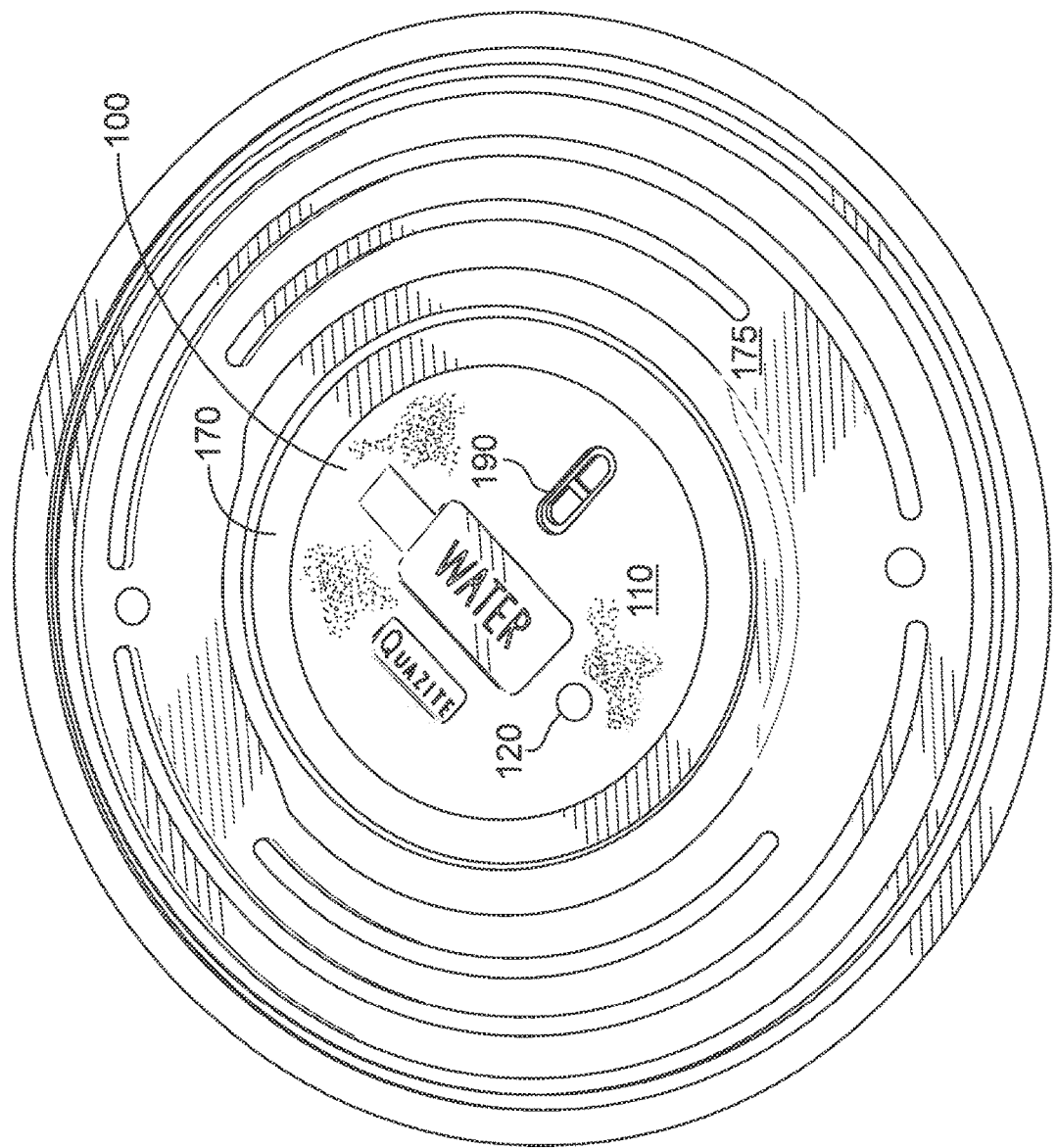
FIG. 6 is a top view of the utility cover of FIG. 1 installed in an opening.

FIG. 6 is a top perspective view of a hybrid utility cover 100 according to an embodiment of the present disclosure. According to this embodiment, hybrid utility cover 100 is removably mounted within a larger utility cover 175. The outer ring 170 of hybrid utility cover 100 is dimensioned to mate with a larger outer ring 175 which may also be cast iron. According to this embodiment, retractable pin 182 (FIGS. 3, 5) engages a locking member surface provided on an inner abutting wall of larger utility cover 175 to lock the hybrid utility cover 100 in place With the arrangement shown in FIG. 6, larger outer ring 175 would normally be permanently affixed over a cavity having, for example, a water meter installed therein. Hybrid utility cover 100 would then be removably installed in larger outer ring 175. In this way, a meter reading module affixed to the lower side of insert 110 can be electronically read without the need of removing the hybrid utility cover 100. If access to the water meter or water reading module is necessary, hybrid utility cover 100 can be unlocked using key 195 and removed.

Figure 7:
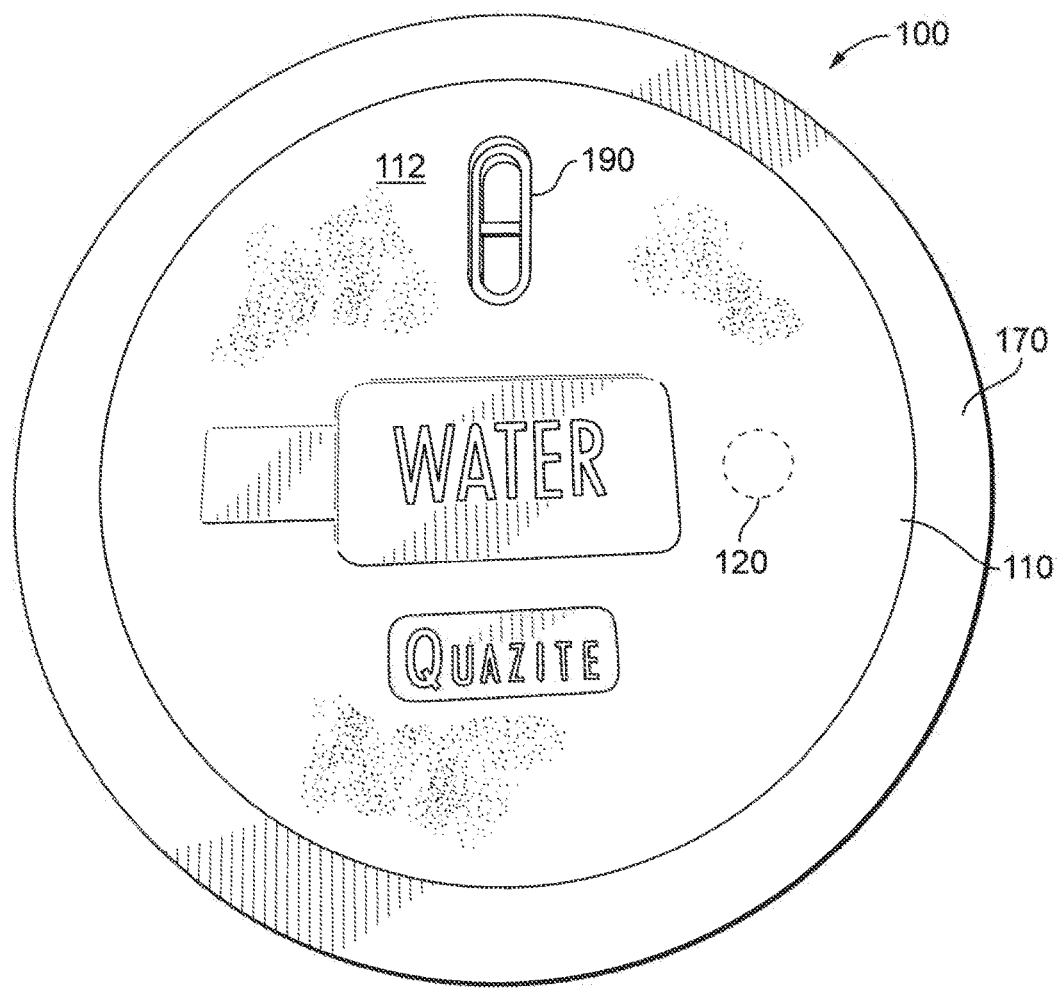
FIG. 7 is a top view of a utility cover according to another embodiment of the present disclosure.

FIG. 7 is a top perspective view of the hybrid utility cover 100 according to another embodiment of the present disclosure. The hybrid utility cover 100 includes insert 110 which may be formed from a polymer concrete within a cast-iron outer ring 170. The hybrid utility cover 100 also includes a keyway 190 and an electronic module insert 120. As shown, the insert 110 may be formed within outer ring 170 utilizing a mold that forms identifying information on the surface of insert 110. For example, the identifying information may include the type of meter (e.g., WATER) and a company or tradename (e.g., QUAZITE). In some embodiments, an electronic module is coupled to the bottom of the insert 110 utilizing the electronic module insert 120 such that the electronic module is within the cavity being covered. The electronic module includes a transceiver and antenna for wirelessly transmitting and receiving information to and from appropriate devices.

Figure 8:
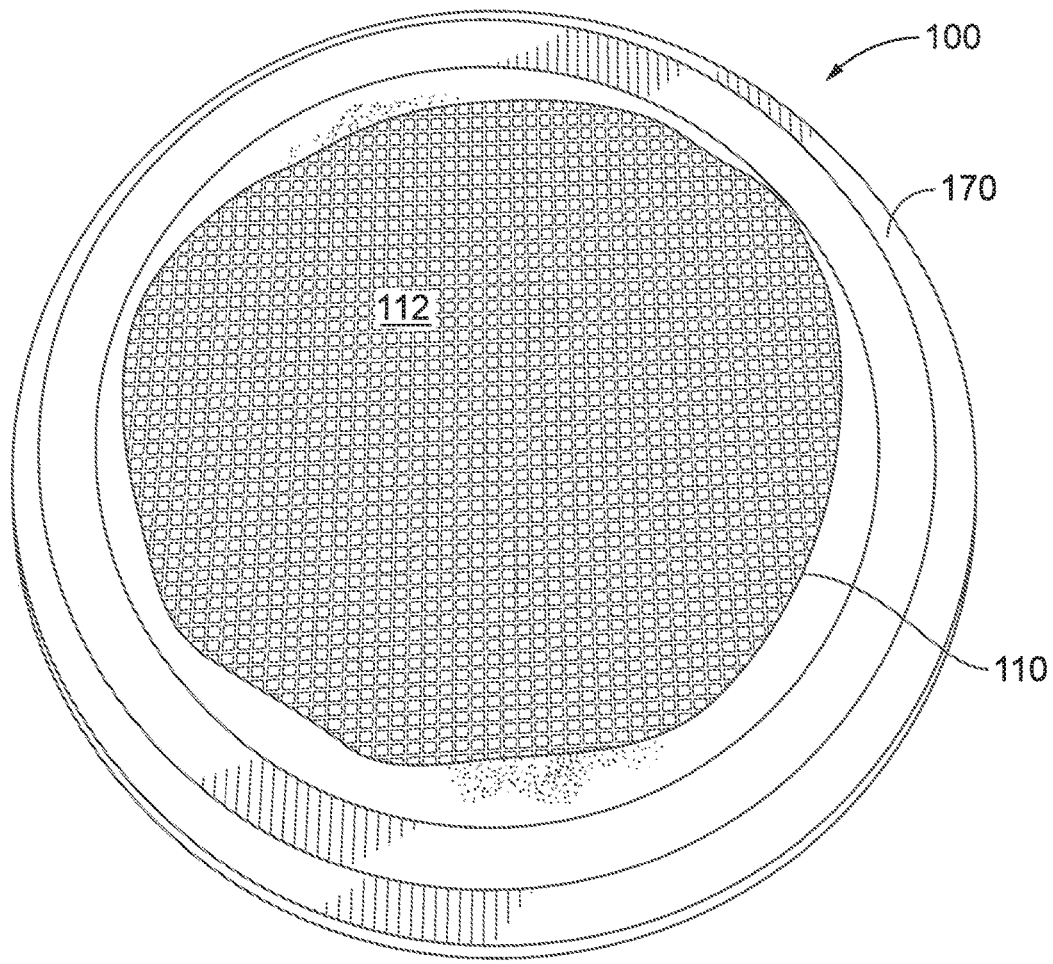
FIG. 8 is a bottom view of a utility cover according to an embodiment of the present disclosure.
Figure 9:
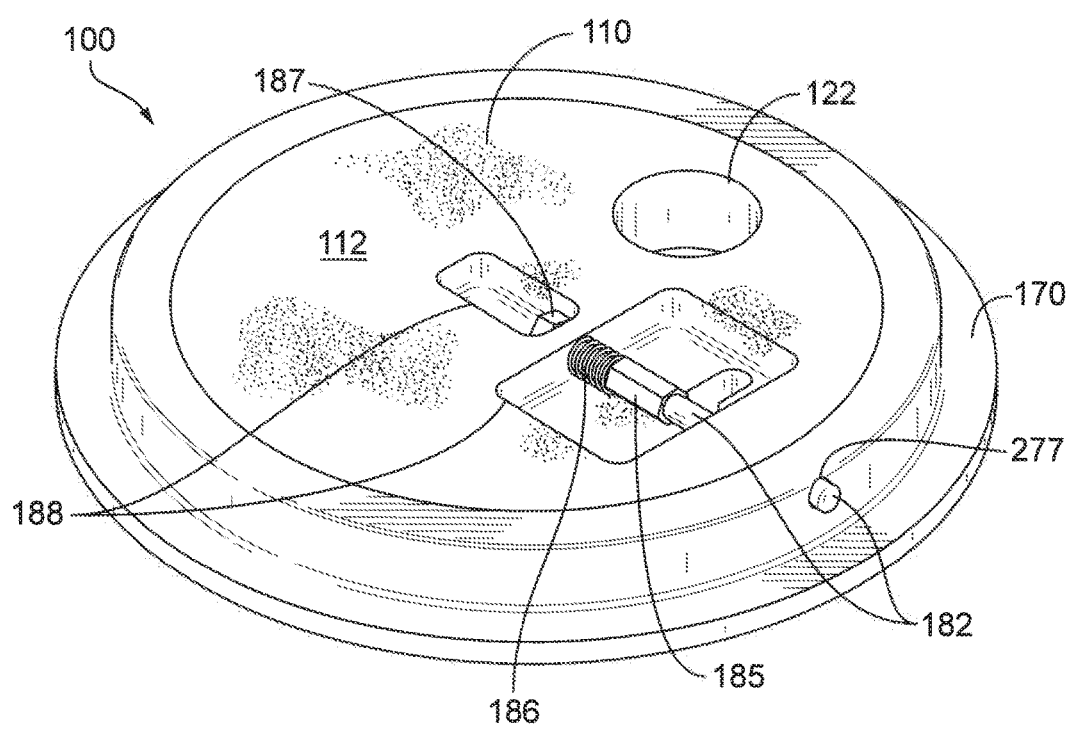
FIG. 9 is a bottom perspective view of a utility cover according to an embodiment of the present disclosure.

Referring to FIG. 8, a bottom perspective view of a partially assembled hybrid utility cover 100 according to an embodiment of the present application is shown. Here, outer ring 170 is shown with insert 110 which may be polymer concrete. A lower fiberglass reinforced layer 112 is also shown. Referring to FIG. 9, according to this embodiment, the next steps of manufacture would include forming electronic module insert cavity 122, locking-mechanism cavity 188 and keyway 190 in insert 110 as well as retractable pin orifice 277 in outer ring 170. The locking components 182, 185-187 may then be appropriately positioned as shown. According to various embodiments of the present disclosure, the lower fiberglass reinforced layer 112 may be omitted if desired.

Figure 12A:
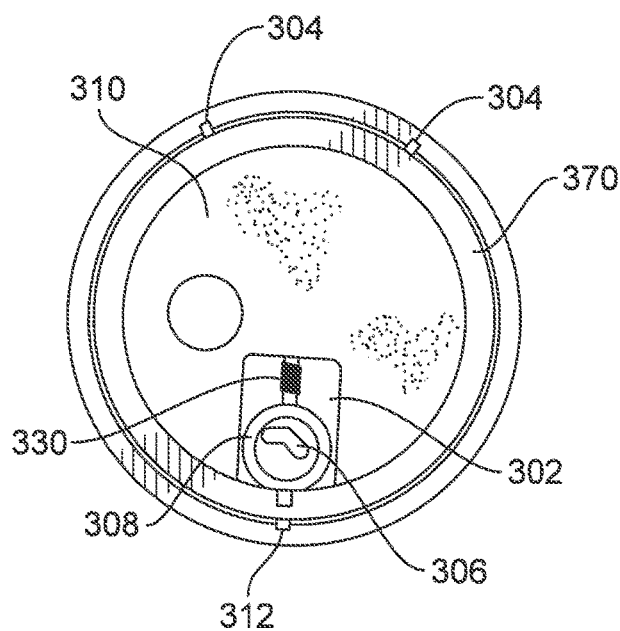
FIG. 12A is a bottom view of a utility cover according to an embodiment of the present disclosure.
Figure 12B:
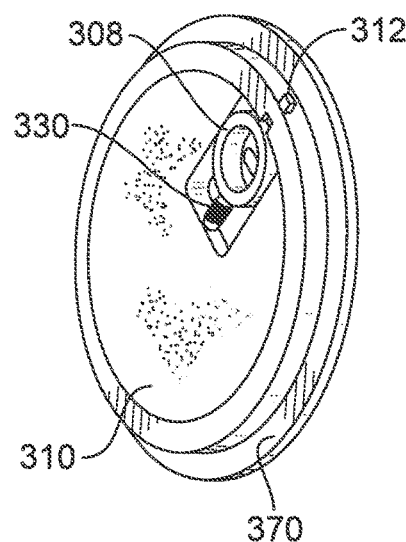
FIG. 12B is a side perspective view of a utility cover according to an embodiment of the present disclosure.
Figure 12C:
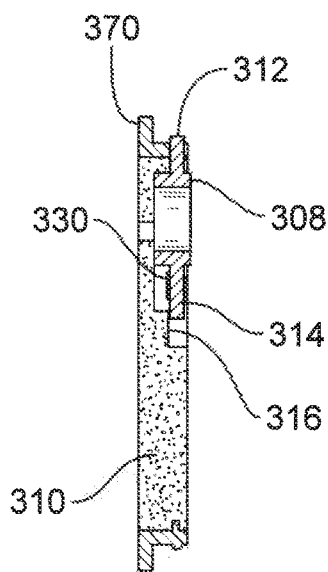
FIG. 12C is a side view of a utility cover according to an embodiment of the present disclosure.

A hybrid utility cover including a locking mechanism according to another embodiment of the present disclosure is shown in FIG. 12A-12C. Outer ring 370 is shown with insert 310 which may he polymer concrete. A lower fiberglass reinforced layer (not shown) may also be provided. The lower bottom side of insert 310 includes a locking-mechanism cavity 302 and keyway 306. According to this embodiment of the present disclosure, a circular ring 308 is dimensioned to slidably fit within cavity 302. A locking pin 312 extends from one side of circular ring 308 into an orifice provided along the side of outer ring 370. A slide pin 314 (see FIG. 12C) extends from an opposite side of circular ring 308 and slides within cavity 316 provided in insert 310. Slide pin 314 holds a compression spring 330 which biases locking pin 312 so that locking pin 312 is maintained in the orifice in the side of outer ring 370 as shown. A pair of fixed lock pins 304 extend from an opposite side of outer ring 370 as shown. Locking pin 312 and fixed lock pins 304 are dimensioned and positioned to fit within corresponding orifices or notches provided in a ring in which the utility cover is to be secured. A key 195 such as that shown in FIG. 2 may be utilized for unlocking the utility cover shown in FIGS. 12A-12C and for removing the utility cover from the position in which it is mounted. The distal end of key 195 is inserted in keyway 306 from the top side of the utility cover and engages circular ring 308. Turning key 195 encages circular ring 308 causing circular ring 308 to move in a direction compressing compression spring 330 and causing locking pin 312 to retreat into outer ring 370. In this position, the key 195 can be used to lift up the utility cover and remove the utility cover from its mounted position.

Figure 10A:
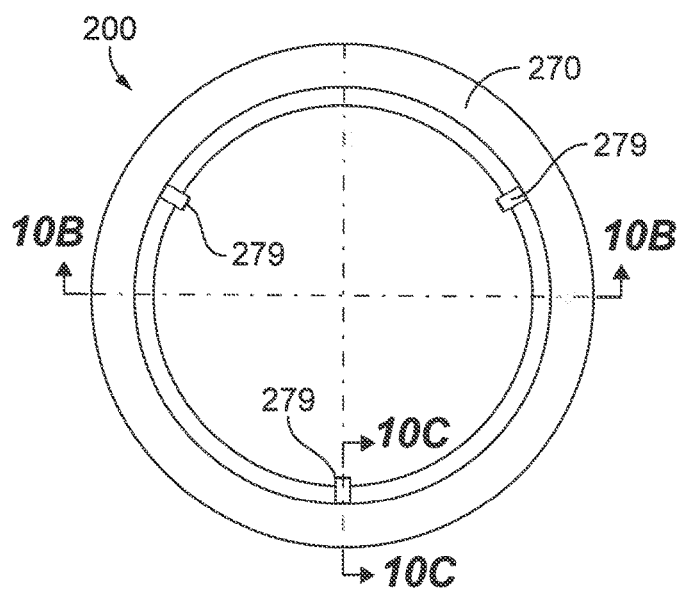
FIG. 10A is a top view of an outer ring forming a portion of a utility cover according to an embodiment of the present disclosure.
Figure 10B:
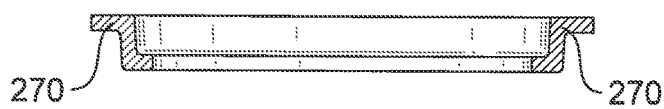
FIG. 10B is a cross-sectional view of the outer ring of FIG. 10A. taken along line 10B-10B.
Figure 10D:
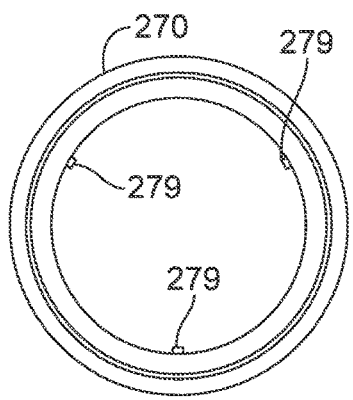
FIG. 10D is a bottom view of the outer ring of FIG. 10A.
Figure 10C:
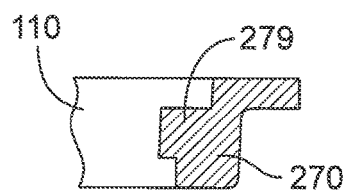
FIG. 10C is a cross-sectional view of a portion of the outer ring of FIG. 10A taken along line 10C-10C.

FIGS. 10A-10E illustrate various views of an outer ring 270 according to an embodiment of the present disclosure, Outer ring 270 is substantially similar to outer ring 170 described above and is shown in more detail in FIGS. 10A-10E. Outer ring 270 may be formed of, for example, cast iron. As shown in FIGS. 10A and 10D, outer ring 270 includes one or more support structures 279 extending from the inside wall of outer ring 270. The support structures 279 may be integrally formed by casting as part of the mold used for forming outer ring 270 using, for example, a sand mold. An insert similar to the insert 110 described above, will be formed within the inner walls of outer ring 270. The insert may be formed, for example, from a material substantially transparent to wireless signals including, for example, polymer concrete. The support structures 279 provide additional support to the insert material and prevent the insert from moving within outer ring 270. As shown in FIG. 10C, support structures 279 extend from the inner wall of outer ring 270 such that the insert material will be locked in place within outer ring 270.

Figure 10E:
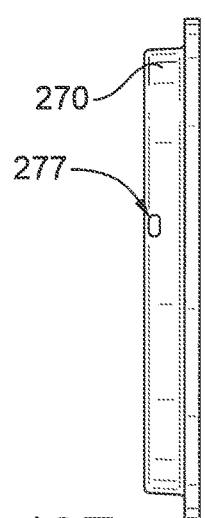
FIG. 10E is a side view of the outer ring of FIG. 10A.

As shown in FIG. 10E outer ring 270 includes a retractable pin orifice 277 that is formed in a lower portion of outer ring 270 for receiving the retractable pin 182 described above with respect to the locking mechanism.

According to an embodiment of the present disclosure as shown in FIGS. 10A-10E, the outer diameter of the ring 270 is approximately 12%16 inches and the outer diameter of the corresponding insert as it rests on the inner ledge of the ring is approximately 10%16 inches and the bottom portion of the insert that rests adjacent to the ledge is approximately 9½ inches. Accordingly, the outer diameter of the insert is approximately 83% of the outer diameter of the ring 270. The lower ledge of ring 270 may be taken into account and an average diameter of approximately 10 inches may be used to determine a ratio of the diameters as above. According to another embodiment, a much wider ring 270 may alternatively be used and consequently a much smaller diameter insert for a ratio of as low as 30% may be used. According to another embodiment, a smaller width ring 270 may be utilized to provide a ratio of 85%-95%.

According to an embodiment of the present disclosure, the hybrid utility cover is disc-shaped, has a diameter between 10-15 inches and is about 1.5 inches thick. In other embodiments the hybrid utility cover may have a square shape, rectangular shape, a prism shape, or other suitable shape. In some embodiments, an exterior cast iron frame having a rectangular prism shape may be filled with polymer concrete with corresponding cavities and other structures and components as described herein. The square shape may be 10 by 10 inches. The rectangular shape may be 10 by 20 inches. Other shapes and sizes may be utilized as appropriate.

When the hybrid-utility cover takes on other shapes besides a disc, the external ring, may be referred to as an external frame or frame, since these components may take on other shapes besides rings.

The illustrated embodiments are described with reference to cast-iron rings or frames. Of course, other materials capable of providing structural support may be used.

According to another embodiment of the present disclosure, insert 110 may include a surface to which an electronic module can be adhesively bonded.

The present disclosure describes exemplary embodiments of utility covers for subterranean utility enclosure systems that provide access to underground utilities and that may include electronic modules that wirelessly communicate through the cover to above-ground receivers.

In some embodiments, the utility cover may include a polymer concrete insert mated to a cast-iron ring. In some embodiments an electronic module mount is molded into the polymer concrete insert. In other embodiments the electronic module mount is glued or otherwise fastened into a cavity within the polymer concrete insert. In some embodiments, the electronic module mount has a threaded opening that is accessible within a cavity at the bottom of the polymer concrete insert. The electronic module is secured to the electronic module mount by engaging the threaded opening of the electronic module mount. The threaded interface allows the electronic module to be removably attached to the hybrid utility cover. Other methods of attaching the electronic module to the hybrid cover may be used.

The electronic module may include a transceiver coupled to an antenna for transmitting and receiving wireless communications. The electronic module is positioned to receive and transmit wireless communications through the insert.

In some embodiments, the utility cover also includes one or more cavities for providing a locking mechanism, and a keyway accessible from a top surface of the utility cover.

In certain illustrative embodiments, the top surface of the insert is covered by a skid resistant surface that is fiberglass reinforced. Additionally, in certain embodiments, the bottom cavities for the insert and lock mechanism are covered by a fiberglass-reinforced layer While illustrative embodiments have been described and illustrated above, it should be understood that these are exemplary and are not to be considered as limiting. Additions, deletions, substitutions, and other modifications can be made without departing from the spirit or scope of the present invention. Accordingly, the invention is not to be considered as limited by the foregoing description.

What is claimed is:

1. A utility cover for covering an opening, the utility cover comprising:
    an outer ring having an outer diameter, a first inner diameter and a second inner diameter less than the first inner diameter, the outer ring forming a support ledge between the first inner diameter and the second inner diameter, the outer ring formed of a first material containing iron;
    an insert having an outer diameter configured to fit into the inner diameter and onto the support ledge of the outer ring, the insert formed of a second material substantially transparent to a portion of the electromagnetic spectrum used by wireless communications, the insert defining a recess in a lower surface thereof, wherein at least a portion of the insert is substantially transparent to wireless communications and comprises a polymer concrete, and wherein the outer diameter of the insert is at least 30 percent of the outer diameter of the outer ring;
    an electronic module mounted to the insert, the electronic module electrically coupled to an antenna for transmitting the wireless communications;
    a locking mechanism positioned within the recess for securing the utility cover to an external frame secured within the opening, the locking mechanism comprising a spring-loaded retractable pin extendable through the outer ring that engages the external frame when locked; and
    two fixed locking pins positioned approximately opposite from the retractable pin, extending outward from the outer ring, and engageable with the external frame.

2. The utility cover of claim 1 wherein the at least portion of the insert is substantially transparent to radio frequency signals.

3. The utility cover of claim 1 wherein the at least portion of the insert allows at least 50% of incident radio frequency energy in the 2.4 megahertz band to pass there through.

4. The utility cover of claim 1 wherein the non-conductive material comprises a structurally-reinforced portion.

5. The utility cover of claim 1 wherein the structurally-reinforced portion comprises a fiberglass-reinforced portion.

6. The utility cover of claim 1, wherein the electronic module is at least one of removably mounted to the insert and formed within the insert.

7. The utility cover of claim 1, wherein the electronic module comprises automatic meter reading equipment.

8. The utility cover of claim 1, further comprising:
a water meter coupled to the electronic module such that the water meter is electronically readable through the insert.

9. The utility cover of claim 1, wherein the first material is selected from one of steel and cast iron.

10. A hybrid utility cover comprising:
a first material containing iron forming an outer ring having an outer diameter, a first inner diameter and a second inner diameter, the outer ring forming a support ledge between the first inner diameter and the second inner diameter;
a second material formed within the inner diameter and on the support ledge of the outer ring, wherein the second material is different than the first material and the second material is substantially more permeable to electromagnetic waves than the first material, the second material defining a recess in a lower surface thereof, wherein at least a portion of the second material is substantially transparent to wireless communications and comprises a polymer concrete, and wherein the outer diameter of the insert is at least 30 percent of the outer diameter of the outer ring;
an electronic module mounted to the second material, the electronic module electrically coupled to an antenna for transmitting the electromagnetic waves;
a locking mechanism positioned within the recess for securing the hybrid utility cover to an external frame, the locking mechanism comprising a spring-loaded retractable pin extendable through the first material that engages the external frame when locked; and
two fixed locking pins positioned approximately opposite from the retractable pin, extending outward from the first material, and engageable with the external frame.

11. The hybrid utility cover of claim 10, wherein the first material comprises cast iron.

12. The hybrid utility cover of claim 10, further comprising at least one reinforcing layer provided on at least the second material.

* * * * *